United States Patent [19]

Marinko

[11] 4,336,484
[45] Jun. 22, 1982

[54] MOTOR CONTROL

[75] Inventor: Joseph A. Marinko, Ambler, Pa.

[73] Assignee: Textron, Inc., Providence, R.I.

[21] Appl. No.: 165,960

[22] Filed: Jul. 3, 1980

[51] Int. Cl.³ .............................................. G05B 19/40
[52] U.S. Cl. .................................... 318/696; 318/432
[58] Field of Search ......................... 318/696, 685, 432

[56] References Cited

U.S. PATENT DOCUMENTS

| | | | |
|---|---|---|---|
| 3,967,179 | 6/1976 | Loyzim | 318/696 |
| 4,107,595 | 8/1978 | Campe | 318/696 |
| 4,145,644 | 3/1979 | Liu | 318/696 |
| 4,255,693 | 3/1981 | Keidl | 318/685 |

Primary Examiner—J. V. Truhe
Assistant Examiner—Eugene S. Indyk
Attorney, Agent, or Firm—John C. Dorfman

[57] ABSTRACT

Solid state control devices are placed in series with each field winding of a step motor having a field for each of two phases. Each control device has a control terminal selectively permitting stepping drive current flow through the series field winding and gate means controlling each terminal. Sequence control means selects the sequence of application of control signals to respective gate means to determine the sequence and direction of drive. A timed current chopper means applies a timed signal to the gate means to determine when the control signal and what part thereof may be applied to the control electrode of the control device to control and adjust the drive effect. In this environment, sensing means is provided to determine when and how much current is flowing in a given field winding and to provide a signal to a comparator which is used in controlling the chopper. Various control circuits are provided for sensing and control in this environment.

11 Claims, 18 Drawing Figures

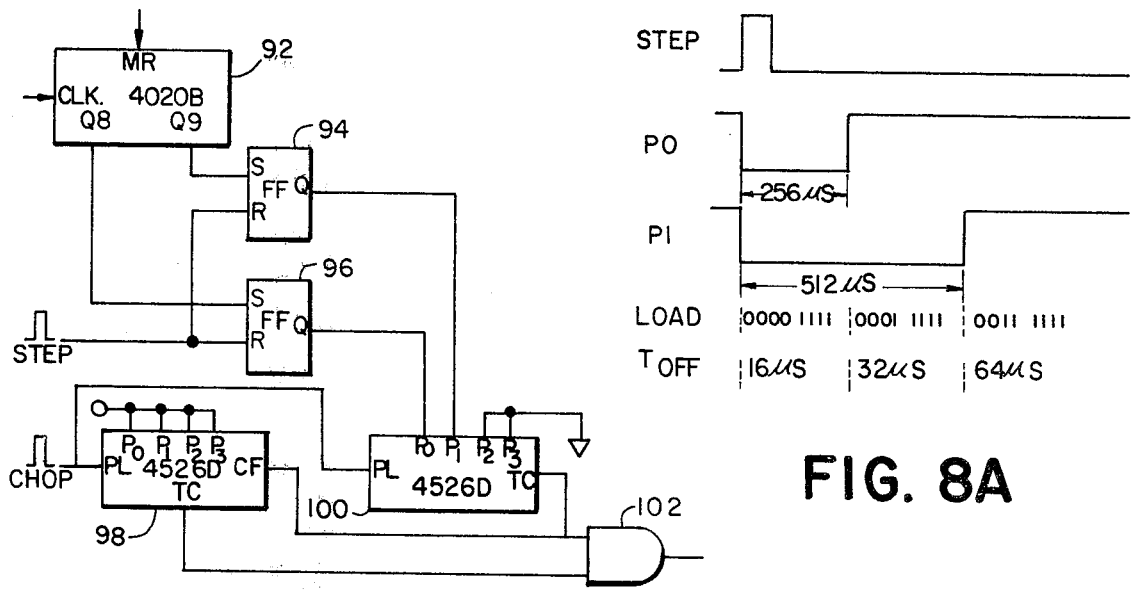
FIG. 8
FIG. 8A
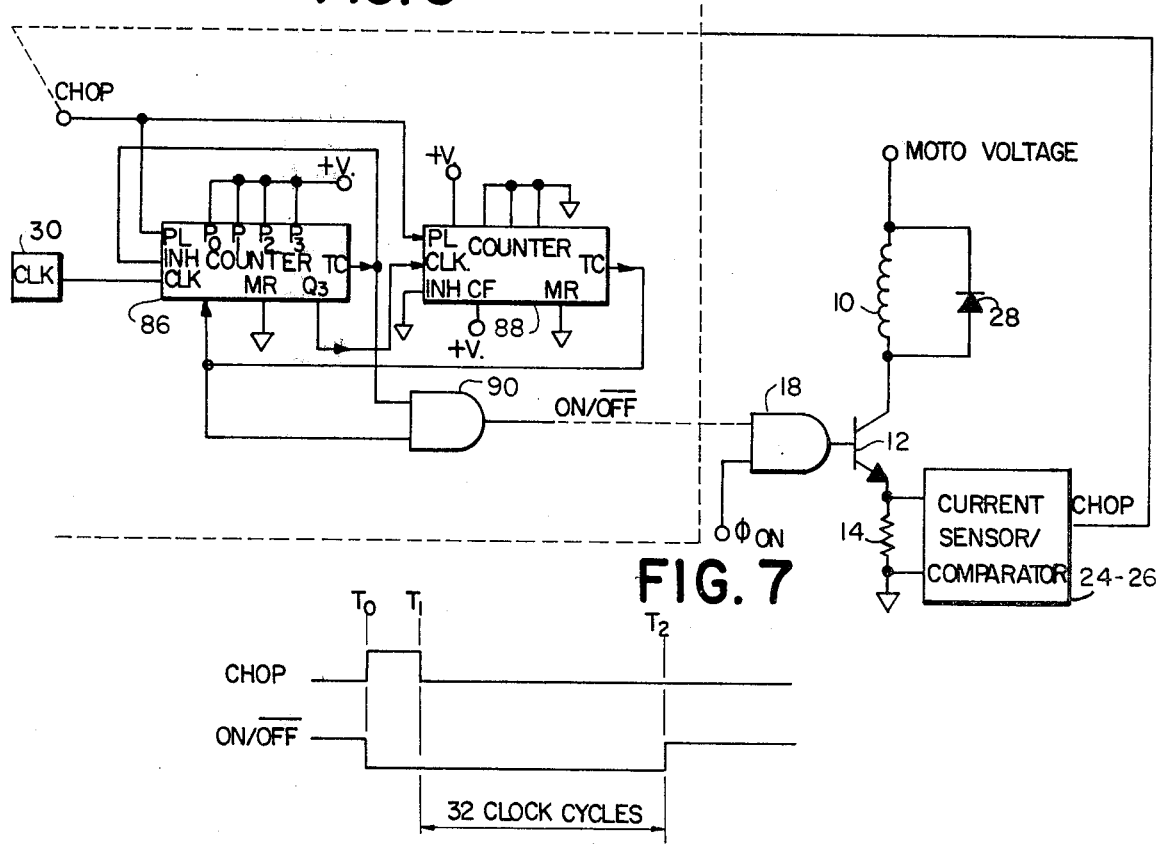
FIG. 7
FIG. 7A

MOTOR CONTROL

The present invention relates to a current modulated step motor drive. This drive system is believed to be unique in both its method of control and its means of implementation. The invention relates to the torque/phase-current control scheme, the velocity-variable timed chopper and the dual-function drive transistor configuration.

THE PRIOR ART

The prior art relates primarily to chopper drive technology.

In conventional chopper drives, a separate power switch is utilized for current regulation purposes. This additional switch results in increased costs and reduced reliability. Because this current regulator is placed in series with the phase-steering transistors, maximum use of the semiconductor switches is not achieved.

The actual chopping operation has the potential for introducing instabilities at intermediate operating speed ranges. The degree of chopping action (usually a time inhibit or a hysteretic current level) has, in the past, been employed without regard to the motor's operating speed.

The prior art has used analog control circuitry. The use of analog control circuitry (particularly in timing applications) is susceptible to problems of drift, temperature effects, noise, etc.

BACKGROUND OF THE INVENTION

The present invention instead of relying primarily on a chopper drive, substitutes an improved current-modulated step motor drive.

It provides a more efficient means of control by using the steering transistors as current regulating devices.

Consideration of balancing phase currents (particularly in half-step operating mode) has traditionally been neglected. The present invention provides a method for insuring phase current equilibrium. In this way, a reduction in low-speed cogging as well as an improvement in positional accuracy is achieved.

In the present invention by allowing the chopping action to be a function of the motor's speed, a reduction in torque fall-off can be realized.

To overcome these problems, control techniques employing readily available digital integrated circuits would be desirable.

The current modulated step motor drive of the present invention provides for all of the above-mentioned needs. It is believed that the following features and advantages of this drive are unique.

Complete digital control provides accurate timing and freedom from drift conditions experienced in analog control circuitry.

All control and feedback signals are completely synchronized with the system clock. This allows for properly timed logic state occurrences, eliminating spurious pulses and decreases the chances of "glitches" being interpreted as real logic signals.

A digital speed range detection scheme is incorporated to provide motor velocity information to the drive. This scheme requires no mechanical apparatus and uses no analog circuitry.

Current chopping action is variable and controlled as a function of motor speed. In this way, problems associated with interaction between stepping and chopping are eliminated.

Current level control is maintained as a function of motor speed. This allows for an extension of torque output into the higher speed ranges.

Accurate half-step positioning is obtained by varying current levels in the phase windings depending upon which state the motor is presently in. When in the one-phase energization state, the phase current is doubled over the value of phase current which is allowed for in the two-phase energization state. This allows for an even distribution of stator flux, resulting in smooth rotation and fine positioning ability.

The current feedback scheme utilized in the chopping control is not affected by variations in the storage times of individual transistors. Because the scheme is self-correcting, the components used do not have to be hand selected so as to assure repeatability.

Dual utilization of the output drive transistors is made. In addition to providing the motor phase switching, the current chopping function is also performed by these transistors.

The torque/phase current control scheme provides the framework of the current modulated step motor drive. The velocity-variable time chopper and the dual function drive transistor configuration are integral developments which are incorporated into this control scheme.

TORQUE/PHASE-CURRENT CONTROL METHOD

When a step motor is driven in the two-phase-on energization mode, a current imbalance in the on-windings can occur. This imbalance will result in a degradation of the absolute positional accuracy of the step motor. Furthermore, if the motor is driving a frictional load, the positional accuracy can be degraded even further. The torque/phase-current control scheme overcomes these problems.

To effectively utilize this method, the step motor is operated with an eight-step switching sequence (half-stepping). In this way, a uniform magnetic flux distribution can be established regardless of the energization state of the motor (one-phase-on or two-phase-on).

In addition to limiting the degradation of the step motor's accuracy, the method offers several other advantages. These include smooth low speed operation, reduction of the effects of low-frequency resonance, and minimal power dissipation at standstill and low speeds.

The following is a description of the above-mentioned positional accuracy problems and the torque/phase-current control scheme used to overcome them. The mathematics has been included for sake of completeness and is not essential for an understanding of the control method.

In a hybrid step motor, operation is dependent upon the interaction and alignment of two magnetic fields; that of the rotor and that of the stator. Because the motor is of permanent magnet construction, its flux field is relatively constant. The stator, on the other hand, is preferably made up of four windings. Each of the windings can be independently energized. Thus, the flux distribution of the stator is strictly dependent upon method of energization of its windings.

When a step motor is operated with two-phase-on energization, the equilibrium position (detent position) is a result of the torque balance established between the two energized phases. Consequently, current variations in these phases can result in a significant error of the step motor's positional accuracy.

A frictional load can also contribute to a reduction in the positional accuracy of the stepper. The degree of this positional error can be approximated by the following proportion:

$$\theta_E = \frac{T_F}{T_M \cdot P} \quad (1)$$

Where
$\theta_E$ = absolute positional error (rads)
$T_F$ = load torque due to coulomb friction (oz-in)
$T_M$ = peak motor torque available (oz-in)
p = number of rotor teeth From this expression it can be seen that an increase in p will result in a decrease of the error, $\theta_E$. Operating the motor in the half-stepping mode has the effect of increasing the number of rotor teeth by a factor of two. Thus, the absolute error can be halved. However, since the half-stepping mode incorporates a one-phase-on-two-phase-on continuous sequence, the effects of phase current imbalance becomes of concern. This can best be illustrated by considering the contribution of each phase current to the overall motor torque as follows:

$$T_{\phi A} = -K_T i_{\phi A} \sin(p\phi) \quad (2)$$

$$T_{\phi B} = -K_T i_{\phi B} \sin(p\phi - \pi/2) \quad (3)$$

Where
$T_{\phi A}$, $T_{100 B}$ = torque contribution of phases $\phi A$, $\phi B$
$K_T$ = motor torque constant
$i_{\phi A}$, $i_{\phi B}$ = instantaneous current in phases A, B
p = number of rotor teeth
The final equilibrium position of the rotor occurs when $$T_{\phi A} = T_{\phi B} \quad (4)$$

From the above, it can be derived that the positional error relative to the true detent position is:

$$\theta_E = \frac{1}{P}\left[\tan^{-1}\left(\frac{K_T \cdot i_{\phi A}}{K_T \cdot i_{\phi B}}\right) - \frac{\pi}{4}\right] \quad (5)$$

This expression shows that if the two phase currents can be made equal, that is:

$$i_{\phi A} = i_{\phi B} \quad (6)$$

the error can be reduced to zero.

Furthermore, it can be shown that when the one-phase-on energization state occurs, the holding torque in this state, $T_{1\phi H}$, should equal the sum of the cumulative holding torques $T_{\phi AH} + T_{\phi BH}$ of the two-phase-energization state. This would allow proper positioning due to the torque balance thus generated. This requirement for torque balance can be expressed as follows:

$$T_{1\phi H} = T_{\phi AH} + T_{\phi bH} \quad (7)$$

The torque/phase-current control method allows the conditions of equations 6 and 7 to be closely approached.

DESCRIPTION OF THE DRAWINGS

FIG. 7 is a schematic diagram of a timed current chopper;

FIG. 7A is a diagram showing the output signal of the chopper of FIG. 7;

FIG. 8 is a simplified schematic diagram of a velocity variable timed chopper in accordance with the present invention;

FIG. 8A is a timing diagram associated with the chopper of FIG. 8;

CONTROL METHOD DESCRIPTION

Figure 1:
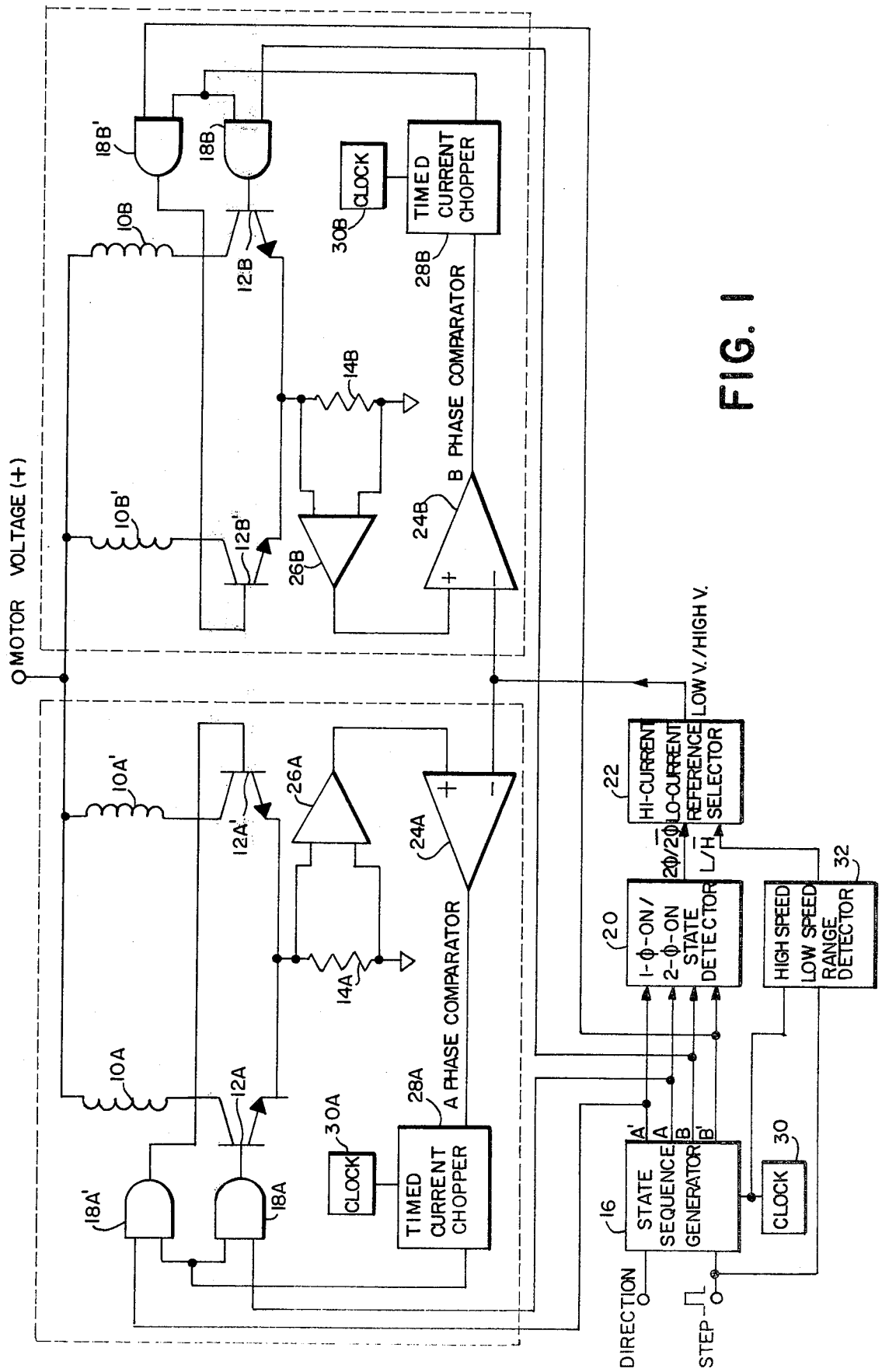
FIG. 1 is a schematic block diagram of the step motor control circuit of the present invention.

The block diagram of FIG. 1 shows the torque/phase current control system for a two phase stepping motor having two separately controlled field windings for each of the two phases. It will be understood that the stepping motor employed may, for example, have a rotor having permanent magnet poles.

It should be noted that the drive portion of the system has been simplified by omission of current amplification and inductive supression circuitry which is employed in conventional manner in practice.

The state sequence generator 16 receives system input commands both as to direction (Dir.) and when to move. Each step input pulse results in the state sequence generator 16 sequentially advancing to the next phase energization state. The outputs of the state generator (A, A', B, B') are applied to "NAND" gates 18A', 18A, 18B and 18B' in the sequence determined by the direction (Dir.) command, and, if not suppressed, applied to the base of the drive transistors 12A', 12A, 12B, and 12B' in their proper stepping order to allow current flow through their series associated field phase winding 10A', 10A, 10B, or 10B'. Consequently, each step command results in the rotor incrementing by one step position.

The four state sequence generator ouputs are also input to the one-phase-on/two-phase-on state detector 20. The digital output of this detector is used to select from the high current/low current reference selector 22 either the high-current threshold reference for the one-phase-energization state or the low-current threshold reference for the two-phase-energization state. The output of the current threshold reference is used as the reference input to both phase current comparators 24A and 24B. Two phase current comparators are needed. Comparator 24A for the A phases current control loop, and comparator 24B for the B phase current control loop.

The second input to each phase current comparator 24A and 24B is a voltage which is representative of the corresponding motor phase currents. This voltage signal is a result of the instantaneous IR potential developed across the corresponding phase current sensing resistor 14A or 14B due to the current flowing through the respective phase windings of the motor. Each current sensing resistor 14A and 14B has its output buffered and scaled by an amplifier 26A or 26B before being input to the comparator. Whenever the current-related voltage exceeds the reference voltage, an output pulse is generated by the appropriate phase current comparator 24A or 24B. This pulse is used to set up and initiate timed current chopper 28A or 28B using clock 30A or 30B all part of clock 30, a timed inhibit signal which inhibits signal cuts off the control power transistors 12A and 12A' or 12B and 12B'. For simplicity the rotor has been omitted since it will be understood to be a standard unmodified rotor, preferably of the permanent magnet type with four poles. The field windings 10A and 10A' of phase A and 10B and 10B' of phase B are connected generally in parallel across a fixed motor voltage. Each winding is connected in series with its own control power transistor 12A, 12A', 12B and 12B', respectively. The two windings of each phase are connected in series with a common current sensing resistor, windings 10A and 10A' with resistor 14A and windings 10B and 10B' with resistor 14B. Thus, a single sensing resistor preferably measures all current in its phase.

Because current sensing is done in each full phase of the motor windings and the two-phase-on energization state involves windings in opposite phases of the motor, equal phase currents in each energized phase can be realized by this control scheme. This can be verified by noting that during the two-phase-on energization state, the same low-current reference is input to both phase-current comparators.

During the one-phase-on energization states, the high-current reference is selected. The value of this threshold level is approximately twice the low-current reference value. More exactly, its value is empirically chosen such that the holding torque of the one-phase-on energization state is equal to the holding torque of the two-phase-on energization state. Thus, it can be seen that the two requirements for reduced positional error (equations 6 and 7) can be closely realized.

Also shown in FIG. 1 is a high speed/low speed range detector 32 responding to step pulse rate as compared to the standard clock 34. This range detector circuit can be useful for applications requiring an extension of the torque-speed capabilities of the motor. The output of detector 32 can be used to provide a logic low to the current reference selector whenever the motor is in operation above a pre-selected speed range so that the low-current reference can be disabled and the high-current reference enabled. Thus, full current can be utilized regardless of whether the motor is in the one-phase-on or the two-phase-on energization state. In effect this allows for an increase in motor torque due to the increased motor current at step rates above the low-speed range.

It should be noted that this mode of operation still insures final positional accuracy because the motor must pass through the low-speed region prior to being stopped. Therefore, when this low-speed region is entered, the high-speed/low-speed detector will again enable the low-current reference for one-phase-on energization, which allows balanced current control as the motor approaches standstill.

Following is a detailed description of each of the blocks shown in FIG. 1. The inductive characteristics of the motor will be disregarded for discussion's sake. Thus, the problems associated with instantaneous current changes will not be considered here.

CIRCUIT DETAILS

Figure 2:
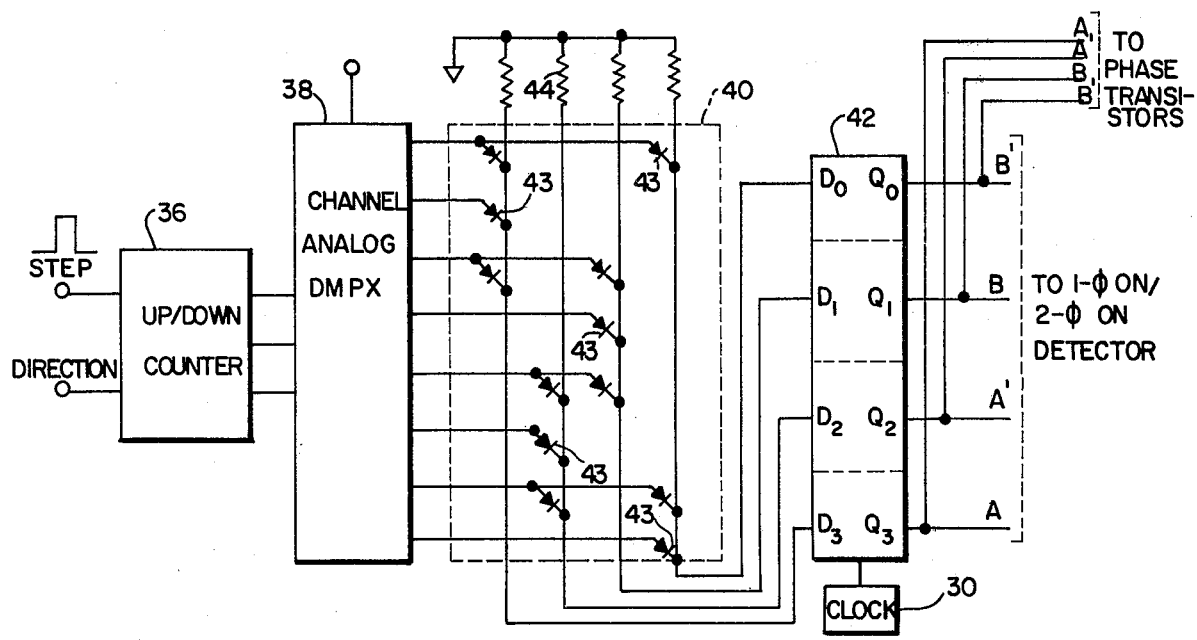
FIG. 2 shows the state sequence generator of FIG. 1 in greater detail but still in block form.

FIG. 2 shows state sequence generator 16 in greater detail. The state sequence generator 16 consists of an up/down counter 36 (for example, solid state chip 4029B), an eight-channel analog demultiplexer 38, an 3×4 diode-matrix ROM40, and an output synchronizer 42.

In operation, the up-down counter 36 receives two inputs: STEP and DIRECTION. The DIRECTION input allows for selecting the direction of motor rotation. A logic "high" at the DIRECTION (Dir.) terminal causes the counter to count-up (CW rotation), while a logic "low" at the terminal causes the counter to count down (CCW rotation).

Actual counting is done by the counter 36 in response to the STEP command. This signal consists of a positive pulse with a duration of 1 S. The occurrence of this pulse causes the counter to increment (or decrement according to the Dir. signal) to the next state. This relates to a half-step positional change of the step motor shaft. The output of the counter is used to select one of the eight outputs of the demultiplexer 38. This selected output is thus switched to the positive rail (V+). The remaining unselected seven outputs remain in the high-impedance state.

The selected one of the digit line output of demultiplexer 38 selects one line of the diode array or matrix 40 and places a +V on the diode or diodes 43 connected to predetermined output line of the array. Each output line corresponds to one of the phase windings 10A, 10A', 10B and 10B' and leads through gate means to control terminal of one of the transistors 12A, 12A', 12B, and 12B'. Each line selection results in a unique 4 bit output from the diode matrix 40. Table 1 lists the outputs of this matrix for each of the sequential states. These outputs correspond to the predetermined proper phase energization sequence necessary for clockwise motor rotation. Counterclockwise rotation is produced by the reverse sequence.

TABLE 1

| State | A | A' | B | B' |
| --- | --- | --- | --- | --- |
| 1 | 1 | 0 | 0 | 1 |
| 2 | 1 | 0 | 0 | 0 |
| 3 | 1 | 0 | 1 | 0 |
| 4 | 0 | 0 | 1 | 0 |
| 5 | 0 | 1 | 1 | 0 |
| 6 | 0 | 1 | 0 | 0 |
| 7 | 0 | 1 | 0 | 1 |
| 8 | 0 | 0 | 0 | 1 |

The outputs of matrix 40 are then synchronized with the system clock 30 at 1 MHz, by means of four clocked D flip-flops 42. These four outputs are then used to turn on the proper phase transistors 12A, 12A', 12B, or 12B'. They are also used as inputs to the one-phase-on/two-phase-on state detector 20.

Figure 3:
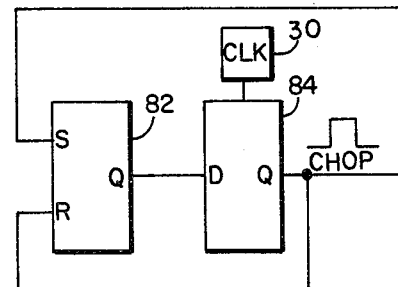
FIG. 3 is a schematic showing one phase of a one/two phase on state detector in accordance with the present invention.
Figure 3:
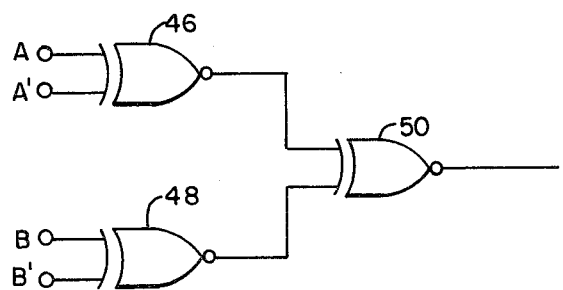

FIG. 3 shows a one-phase-on/two-phase-on state detector. This detector consists of three EXCLUSIVE-NOR gates 46, 48, and 50 whose function it is to decode the state generator's outputs. The output of this decoder is a logic "high" during the two-phase-on energization state and a logic "low" during the one-phase-on energization state. This output is provided to the current threshold reference selector and is there used in selecting either the high-current or low-current threshold voltage reference. The truth table for this decoder is shown below in Table 2.

TABLE 2

| A | A' | B | B' | TP/OP |
|---|----|---|----|-------|
| 1 | 0  | 0 | 1  | 1     |
| 1 | 0  | 0 | 0  | 0     |
| 1 | 0  | 1 | 0  | 1     |
| 0 | 0  | 1 | 0  | 0     |
| 0 | 1  | 1 | 0  | 1     |
| 0 | 1  | 0 | 0  | 0     |
| 0 | 1  | 0 | 1  | 1     |
| 0 | 0  | 0 | 1  | 0     |

Figure 4:
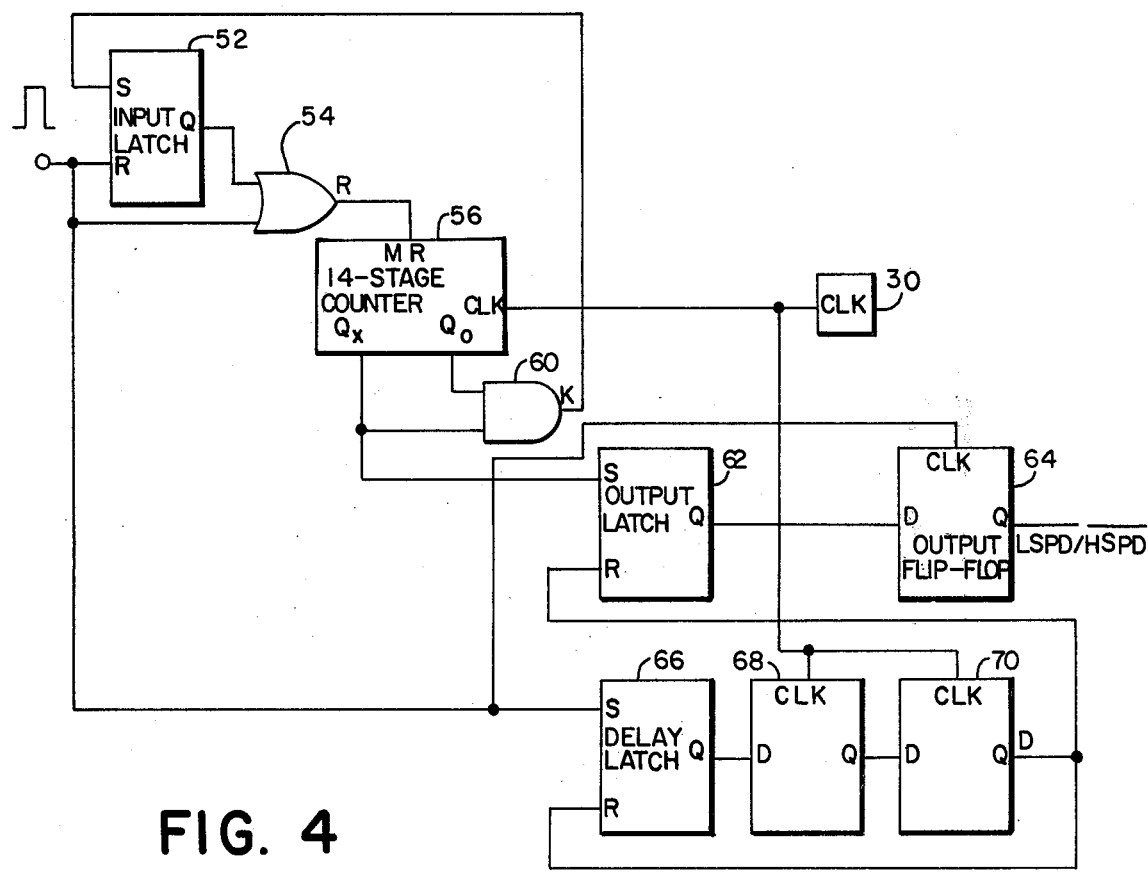
FIG. 4 is a block diagram of a high speed/low speed range detector in accordance with the present invention.

FIG. 4 shows the high-speed/low speed range detector. The high-speed/low-speed range detector 32 determines whether the step motor is operating above or below a pre-selected frequency. A logic high at the output represents operation in the low-speed range whereas a logic low at the output represents operation in the high-speed range. As seen in FIG. 1, the output of the range detector 32 receives an input pulse from the same source as state sequence generator 16. Input latch 52a and delay gate 54 both receive the pulse and pass it on to 14-stage-counter 56 after a one clock pulse delay. The 14-stage counter, for example, solid state chip 4029B, uses the clock to time the period between successive input step pulses. Whenever a step pulse occurs the counter 56 begins a new counting sequence. By selecting and monitoring any one of the counter's outputs, it can be determined whether a certain length of time has been executed within the step period. This, in turn, can be related to the step-rate frequency range in which the motor is operating (high-speed range or low-speed range).

Table 3 lists the times which elapse before the given output ($Q_x$) goes high (assuming a 1 mHz clock frequency). Also shown in the table is the approximate frequency which defines the break between high-speed and low-speed ranges for each given counter output. In other words, if $Q_{10}$ is selected, the low-speed range thus defined is between 0 and 1 kHz. The high-speed range is defined as all frequencies above 1 kHz. Feedback is provided through AND gate 60 to the S terminal of latch 52.

TABLE 3

| $Q_x$ | TIME | STEP RATE* |
|-------|------|------------|
| $Q_6$ | 64 μS | 16 KHz |
| $Q_7$ | 128 μS | 8 KHz |
| $Q_8$ | 256 μS | 4 KHz |
| $Q_9$ | 512 μS | 2 KHz |
| $Q_{10}$ | 1024 μS | 1 KHz |
| $Q_{11}$ | 2048 μS | 500 Hz |
| $Q_{12}$ | 4096 μS | 250 Hz |

TABLE 3-continued

| $Q_x$ | TIME | STEP RATE* |
|-------|------|------------|
| $Q_{13}$ | 8192 μS | 125 Hz |

*Approximate step rate above which is considered the high-step range. (For selected value of $Q_x$).

In addition to the circuit input latch 52, 14-stage counter 56 and the delay latch 66 can be seen to consist of an output latch 62 and an output flip-flop 64. For discussion purposes, it will be assumed that $Q_{10}$ of the counter has been selected as the monitored output ($Q_x = Q_{10}$). In this case, whenever a step period exceeds 1024 counts (1024 μS for a 1 MHz clock), the output latch will be set by the counter's output, $Q_x$. Therefore, whenever an input step occurs, the state of the output latch will reflect the time duration of the preceeding step period.

Operations is as follows: When an input step pulse occurs, its rising edge immediately clocks in the state of the output latch 62 to the output flip-flop 64. If the previous step period was less than 1024 counts (1024 μS), the output will go low, indicating that the motor speed is in the high-speed range. If the previous step period was equal to or greater than 1024 counts, the output will go high, indicating that the motor speed is in the low-speed range. The remaining circuitry resets the internal state of the detector so that sampling can properly begin for the present stop period. This involves delay latch 66 and one pulse delay counter circuits 68 and 70. This sampling proceeds as follows: The counter output $Q_x$, and its first output stage, $Q_o$, are NAND gated together through gate 60. This is necessary for low-speed motor operation so that the counter does not cycle more than once in a given step period. One clock pulse after the $Q_x$ output goes high, the $Q_o$ output will also go high, thus allowing output K of gate 60 to go high. The logic high at point K results in the input latch 52 being set. Consequently, point R goes high and activates the master reset of the 14-stage counter. The reset state of the counter is held until the next step pulse occurs and resets the input latch.

If the motor is operating in the high speed range, the $Q_x$ output will not be high when the step pulse occurs. In this case, the step pulse itself forces point R high and resets the counter. In both of the above cases, the counter begins its new counting sequence on the falling edge of the step pulse.

The delay latch is used to avoid problems associated with clocking the output flip-flop and resetting the output latch simultaneously. It effectively delays the step pulse by approximately 2 μS. Its output, the delayed signal D, is then used to reset the output latch. This is now assured of occurring after the data of the output flip-flop has been clocked in. The D signal is also used to reset the delay latch. Thus, the internal state of the detector can be cleanly reset so that proper speed range detection can be consistently guaranteed.

Figure 5:
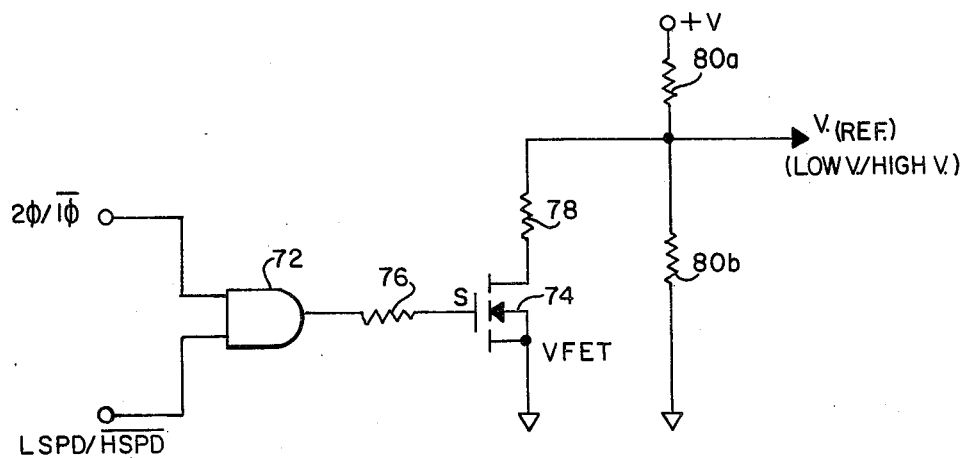
FIG. 5 is a detailed diagram of the high current/low current selector.

Referring now to FIG. 5, the high-current/low-current reference selector 22 is shown. As seen in FIG. 1, the high-current/low-current threshold reference selector is used to provide one of two possible voltage references to each phase current comparator 24A and 24B. The output reference voltage (either LOW V or HIGH V) to be selected is determined by the states of the two digital input signals, $2\phi/1\phi$ from the one-phase-on/two-phase-on detector 20 of FIG. 3 and LSPD/HSPD from the low-speed/high-speed range detector 32 of FIG. 4. The output, $V_{REF}$, is used to establish the peak current level in the step motor phase windings.

Each half of the motor has its own current control loop (FIG. 1). The reference input for each of these loops is provided by the output of the single high-current/low-current threshold reference selector. Thus, the average motor current per step is dependent upon the state of this output. When $V_{REF}$=LOW V, the lower selected value of current is allowed. When $V_{REF}$=HIGH V, the higher selected value of current is allowed. These two values of motor current are selected to satisfy the torque and positional requirements, as well as the thermal ratings, of the motor.

In operation, whenever the motor is running in the high-speed range (LSPD/$\overline{\text{HSPA}}$=0), the HIGH V output is always selected. This insures that the motor will be supplied with enough current to provide the increased torques needed for high-speed operation.

When the motor is operating in the low-speed range (LSPD/$\overline{\text{HSPD}}$=1), the output reference which will be selected depends upon whether the motor is in the one-phase-on energization state or the two-phase-on energization state.

During the one-phase-on energization state ($2\phi/\overline{1\phi}$=0), one in each winding phase of the motor is energized. Thus, the LOW V reference is selected. This allows for a balanced current to flow in each energized phase winding because both phase-current comparators receive the same reference voltage. Moreover, the value of this reference voltage can be selected so that it corresponds to the proper level of motor current necessary for torque balance between the two energized states (one-phase-on and two-phase on).

FIG. 5 shows the circuit details for the high-current/low-current threshold reference selector. The two inputs are fed through AND gate 72 across resistor 76 to VFET 74 (which, for example, may be a VN66 AK). Point S will be high when the motor is operating in the low-speed range and the two-phase-on energization state occurs. With point S being high, the VFET 74 is forced into conduction and exhibits an on-resistance of less than 2 ohms. This results in the value of $V_{REF}$ being determined by the voltage divider relationship established by resistor 80a and the parallel combination of resistor 80b and 78 (neglecting the effects of the on-resistance). The following equation for LOW V expresses this relationship:

$$\text{LOW } V = \frac{V \cdot R}{R_1 + R_2}, \text{ where } R = \frac{R_2 \cdot R_3}{R_2 + R_3}$$

When the motor is operating in the high-speed range or in the low-speed range with one-phase-on energization, point S will be forced low. This causes the VFET 74 to be cut off which effectively removes resistor 78 from the resistive divider network. In this case the value of $V_{REF}$ is solely determined by the divider relationship of resistors 80a and 80b. The following equation for HIGH V mathematically defines this value:

$$\text{HIGH } V = \frac{V \cdot R_2}{R_1 + R_2}$$

The following table of operation shows each of the possible combinations of inputs and the resulting output:

TABLE 4

| TP/OP | LSPD/HSPD | $V_{REF}$ |
|---|---|---|
| 0 | 0 | HIGH V |
| 0 | 1 | HIGH V |
| 1 | 0 | HIGH V |
| 1 | 1 | LOW V |

Thus, it can be seen that a variable (two-state) voltage reference with an easily modified output can be realized. This output can then be used by the current control loop for establishing the desired current levels in the motor.

Figure 6:
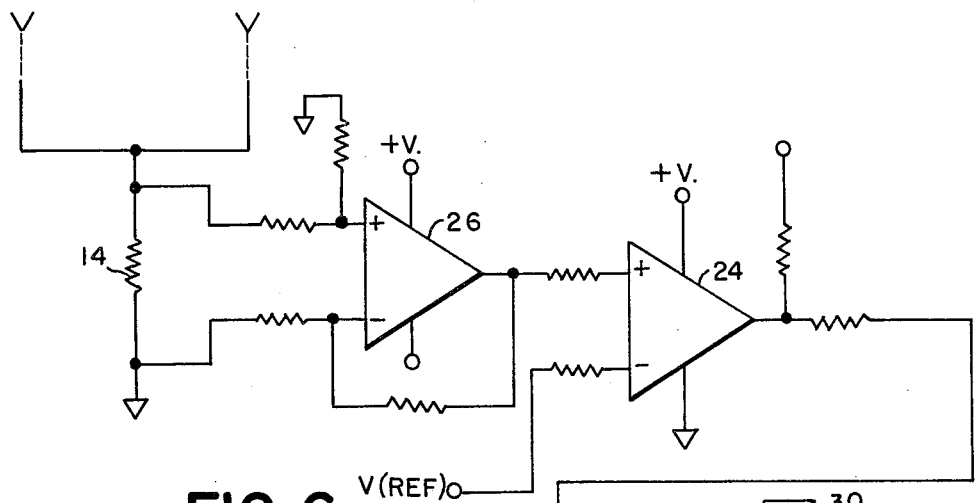
FIG. 6 shows in greater detail circuit components preferably used in connection with the sensing resistor seen in FIG. 1.

FIG. 6 shows one of two system current sensor/comparator circuits. The function of the current sensor/comparator is twofold. First, it senses instantaneous motor current and produces a usable voltage signal ($V_{SIG}$) indicative of the motor current. Second, it compares this current $V_{SIG}$, to a reference voltage, $V_{REF}$, and provides a logic high whenever $V_{SIG}$ exceeds $V_{REF}$. Thus, it can be seen that the circuit consists of two stages: a current-to-voltage converter and a voltage comparator (to be called a phase current comparator).

As seen in FIG. 1, in operation, the circuit's digital output is used to signal the timed current chopper for the purpose of regulating motor current. That is, the output is used to initiate a timed current inhibit whenever the output goes high. In this way, the motor current will decay to a level below the reference threshold of the comparator. At this point, the output will go low which disables the current inhibit. Thus, current flow will be allowed and the cycle will be repeated.

It should be noted that two current sensor/comparators 24 and 26 are used, one in each current control loop. The two current loops are necessary so that current in each half of the motor can be independently regulated.

Referring to FIG. 6, the sensing resistor 14 is placed in series with the motor windings. A low impedance (0.1 ohms) resistor is used so as to minimize the effects of its presence with respect to other components. Because of its series placement, any current flowing in the motor must also pass through the resistor. In this way, a measure of the motor current can be converted to a low-level voltage developed across the resistor. The voltage developed is differentially input to the operational amplifier circuit 26. This configuration is used to amplify the current signal to a practical level, typically a gain of 10, and to eliminate any common mode noise which may have been picked up.

The output of this op-amp 26 is then provided to the non-inverting input of the phase current comparator 24. The voltage reference level, $V_{REF}$, which is the output of the high-current/low-current reference selector of FIG. 5 is provided to the inverting (reference) input terminal of comparator 54. Thus, whenever the current-related voltage is below the two-state threshold level, the comparator's output will be pulled to ground (logic low). As the motor current rises, the voltage signal will follow to the point where it exceeds the reference threshold. When this occurs, the comparators's output will switch to the +V rail (logic high) which results in the R-S flip-flop 82 being set. The output of this flip-flop is then synchronized with the 1 MHz system clock 30 by means of the D flip-flop 84. This output (CHOP) will then remain in the high state until action is taken elsewhere to reduce the motor current below the threshold level. Once current is reduced, the CHOP output will again go low bringing the circuit back to its initial state. At this point, the cycle is ready to be repeated.

From the above, it can be seen how a digital signal capable of relating the value of the motor current to a reference level can be realized.

The overall location of timed current choppers 28A and 28B are shown in FIG. 1. Each of these choppers is a circuit as shown in FIG. 7 and the output signal of the circuit in FIG. 7A. The timed current chopper is used to provide a timed digital signal which, when active, inhibits the flow of current in the motor winding. This timed inhibit is set up and initiated on command from the current sensor/comparator 24A or 24B (shown in FIG. 6) whenever motor current exceeds a preset level.

FIG. 7 shows a schematic of the timed current chopper. The circuit consists of two programmable binary down counters 86 and 88 (typically 4-bit provided by a chip such as 4526B) the 1 MHz clock 30 and a NAND gate 90 used for indicating the status of the counters (0=present or counting; 1=latched terminal count). Since gate 90 outputs into control gate 18, FIG. 7 also provides a simplified sketch of a motor phase winding 10 and its associated switching transistor 12 and control gate 18 as shown in the pertinent part of FIG. 1.

Operation of the timed current chopper is as follows. Initially, transistor 12 is enabled and the two counters 86 and 88 are locked in the terminal count state (ON-/OFF=1). The rising motor current is monitored and compared to a reference level by means of the current sensor/comparator CHOP signal applied at the PL terminal. When motor current is below the threshold level, the output, CHOP, is low. As current rises above the threshold, CHOP goes high which activates the parallel load (PL) input of both down counters. At this point, the data present at the parallel inputs (P0-P3) is entered into the counters and held. Simultaneously, the counter's terminal count (TC) outputs go low causing ON/OFF from gate 90 to also go low. This causes transistor 12 to turn off which subsequently forces motor current in its series winding 10 to decay to a value below the reference threshold. When this point is reached, CHOP again goes low (ON/OFF remains low). This now allows the counters 86 and 88 to begin counting down. The duration of the countdown period is a function of the 1 MHz input clock 30 and the count loaded into the parallel input ports (1111 1000=32$_{10}$). Thus, in this case, the countdown period is 32 $\mu$S. After counting down to 0000 0000, both TC outputs go high. This results in ON/OFF going high, completing the cycle by turning transistor 12 on. This cycle is then continuously repeated as long as the $\phi_{on}$ input is enabled (high). In this way, the current level in the motor can be controlled.

An important feature of this circuit is a guaranteed current inhibit time which is provided regardless of variations in the base-storage times of the phase transistors 12. More precisely, the timing of the inhibit period does not begin until transistor 12 is completely out of conduction and the motor current is falling. This guaranteed time is a result of two factors. First, the CHOP signal provides true phase current feedback information. That is, CHOP=1 whenever the phase current exceeds the reference threshold and makes a high-to-low transition only after transistor conduction ceases and motor current is falling. Second, the counters are held in the preset (non-zero) state whenever the PL inputs (CHOP) are high. Consequently ON/OFF is low. Furthermore, countdown from the preset state begins only after the high-to-low CHOP transition occurs. Therefore, with the above characteristics of the CHOP signal, the countdown period does not begin until true conduction ceases. This eliminates chances of having excessive current due to long transistor storage times and generating timing problems due to the storage times exceeding the inhibit time.

The timing diagram of FIG. 7A depicts the action of circuit operation. T$_0$ represents the point of which the motor current exceeds the threshold level and causes rise of the CHOP signal; T$_1$ represents the downcount point of which motor current conduction ceases and begins; and T$_2$ the end of the countdown period.

The description of the torque/phase-current control scheme of FIG. 7 completes the detailed circuitry descriptions effectively explaining the systems of FIG. 1. It should be noted that the power section included for reference (drive transistor circuitry 12 and 18, suppression circuitry 28 and inductive discharge paths 10, 12 and 14) has been greatly simplified where it appears in the discussion. Further details of this circuitry may be included in the section dealing with the dual-function drive transistor configuration.

VELOCITY-VARIABLE TIMED CHOPPER

The idea of a timed current chopper has been presented above. The circuitry shown and described in connection with FIG. 7 indicated that upon command, a blanking pulse of fixed time duration is generated. This pulse then is used to inhibit the rising current in the motor phase windings.

Because this inhibit time is fixed, compromises must be made when selecting the length of its period. A long blanking time (low switching frequency) is ideal when considering power transistor switching losses because the dissipation increases linearly with frequency. However, a long off-time cannot be tolerated if high-speed performance is desirable. At high stepping rates, the long off-time becomes a significant part of the entire step period which results in a reduction of motor output torque. Consequently, a compromise between reliability and performance must be met. A better choice would be to make the blanking time variable and dependent upon the rate of motor speed. This alternative can be realized by means of the velocity-variable timed chopper. A description of this circuit follows.

FIG. 8 shows a simplified schematic of a velocity variable timed chopper, an improvement in the timed current chopper circuit of FIG. 7. It employs a combination of the high-speed/low-speed range detector circuit of FIG. 4 and the timed current chop of FIG. 7. It should be noted that the velocity-variable timed chopper is meant to replace directly the timed current chopper of the previous section. The previously described functions and operation of the circuits of FIGS. 4 and 7 is assumed as a starting point in the following discussion.

In FIG. 8 a 14-stage binary counter 92 (preferably as 4020B chip) is timed by a 1 MHz clock 30 and is reset at the beginning of each step period by the occurrence of the step command pulse. Following each reset by the initiating pulse, the counter 92 begins its counting sequence. Should the counter finish a complete counting sequence before the next step pulse occurs, the counter will return to its zero state and hold there until the next step pulse occurs. This is made possible by the step input conditioning circuitry previously described, (delay latch of the high speed/low speed range detector). It should be noted that the counter's outputs Q8 and Q9 can be used as an indication of the time duration of a given step period.

A programmable binary down counter is provided by the cascaded configuration of counter chips, such as chips 4526B. Upon receiving a CHOP pulse, the data contained on the $P_0$–$P_3$ inputs are loaded into the counter and down-counting proceeds. During this counting interval, the output of AND gate 102 is low, which signal is used to inhibit the phase winding energization. When the zero count (0000 0000) is reached, the counters are held low until the next CHOP pulse is received. Whenever the counters are in this zero state, the AND output of gate 102 is high which allows phase energization. Thus, it should be seen that the duration of the counting sequence can be controlled by the data input to the counters 98 and 100 at the occurrence of the CHOP pulse.

It should be noted that multiple output taps are available on the counter 92. By monitoring any specific tap, it can be noted whether the step duration has exceeded a specified time interval. This, in turn, can be related to the speed of the step motor. In the velocity-variable timed chopper, this information is used by the 4526B chip down-counter 98 and 100 to provide a variable blanking pulse which has a duration dependent upon the motor speed. Its operation will now be detailed, referring to FIG. 8.

When a step pulse is received, two events occur: counter 92 is reset and begins counting and the two R-S flip-flops 94 and 96 are reset. At this time, the parallel inputs of the down-counters 98 and 100 will be 1111 0000 (equivalent to a count of 16). Thus, whenever a CHOP pulse occurs, a blanking time of 16 μS will be realized.

Meanwhile, the counter 92 continues counting (providing, of course, that the next step pulse has not occurred) and reaches a count of 256. At this time, the Q8 output of counter 92 goes high and sets the lower R-S flip-flop 96. This results in the $P_0$ input of counter 100 being set. Now, the cumulative parallel input will be 1111 1000 (equivalent to a count of 32). The occurrence of a CHOP pulse now will generate a blanking time of 32 μS. This will be the case until the counter 92 reaches the count of 512, again, providing that the next step pulse has not occurred.

At the count of 512, the Q9 output of counter 92 will go high, triggering flip flop 94 and thus changing the parallel input to 1111 1100 (equivalent to a count of 64). At this point, and until the arrival of the next step pulse, the occurrance of a CHOP pulse will generate a blanking pulse with a time duration of 64 μS.

The above process will be repetitively initiated by the arrival of each step pulse.

In summary, as seen in timing diagram FIG. 8A, during the first 256 μS following a step pulse, a blanking time of 16 μS will be realized. Between the 256 μS and 512 μS period, the blanking time will be increased to 32 μS. Finally, 512 μS after the appearance of the step pulse, the blanking time will become fixed at 64 μS. This blanking time will remain until the next step pulse occurs and the process is repeated. The timing diagram FIG. 8A summarizes this sequence of action.

With the above scheme, high frequency chopping can be realized for step periods of short duration so that high-speed performance is possible. At the same time, low frequency chopping can be obtained for long duration step periods. This results in minimal transistor switching losses during low-speed operation and standstill.

It should be mentioned that each step will see a progression from high-frequency blanking to low-frequency blanking. This is an added advantage due to the fact that the high-frequency chopping (which results in a higher average current) occurs at the onset of the step pulse. It is here that higher torques are needed to overcome the frictional effects of stepping. The higher average current satisfied this increased torque demand. Further, since the lower frequency switching (which results in a lower average current) occurs toward the end of the step period, the inertial effects of the stepping can be dampened which results in a reduction of overshoot.

In conclusion, it should be seen how the velocity-variable, timed chopper can be used to effectively and advantageously control the phase currents in a step motor.

CHOPPER-DRIVER OUTPUT CONFIGURATION

The preceeding sections dealt with the various control schemes which together provide the framework for the current modulated drive. However, all of the systems described are dependent upon a reliable output stage. This stage must be capable of powering the inductive load of the step motor in both a reliable and efficient manner. Therefore, the type of output stage used in the drive is crucial to the implementation of the control techniques described. The chopper-driver transistor circuit configuration shown in FIG. 9 meets the requirements of a high-performance, reliable and economical power converter.

The outstanding feature of this circuit configuration is that double utility is made of the output power transistors 12A and 12A' (and 12B and 12B' in a similar system not shown). Their operation is such as to energize each motor phase in its proper sequence and regulate the current in each phase during its energization period.

This configuration presumes and takes advantage of the bifilar field winding in the step motor. Because of the bifilar construction and control methods used, the motor can be effectively driven in a bipolar fashion. This concept will be clarified in the following description.

Figure 9:
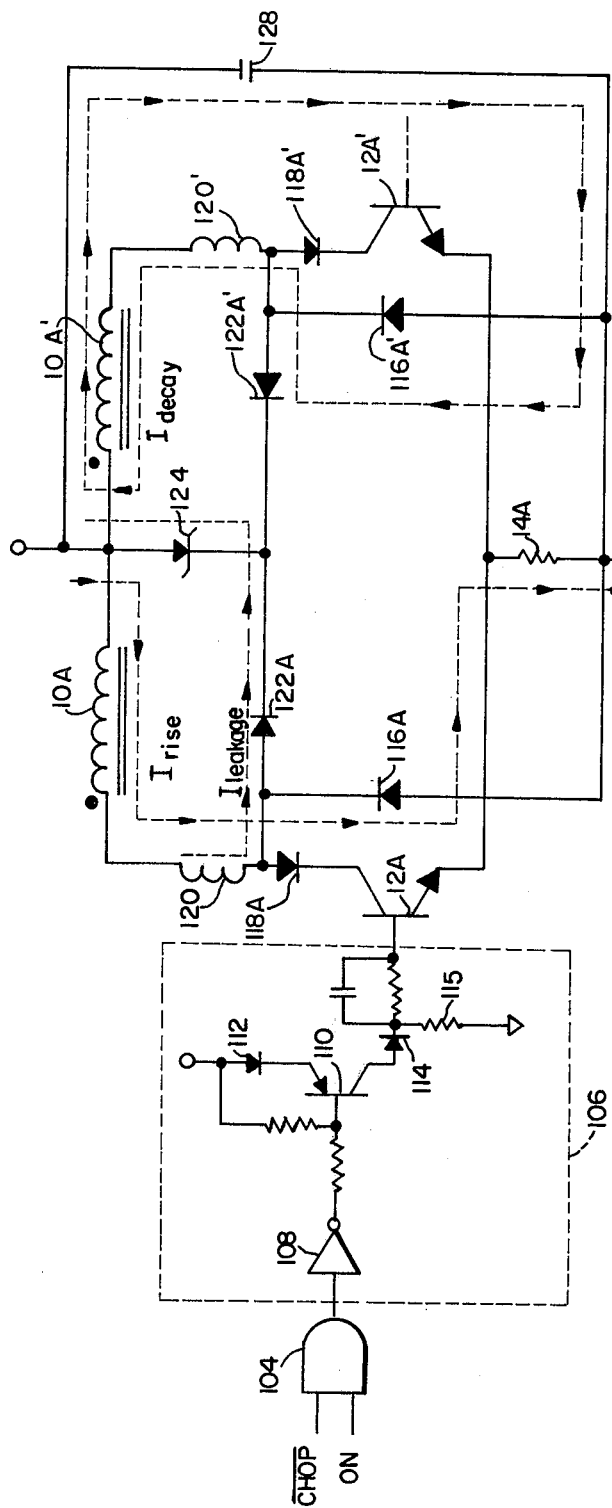
FIG. 9 is a circuit diagram representing one-half of the driver output stage of the system of the present invention.

The circuit shown in FIG. 9 represents one-half of the drive's output stage. Because its complementary half is identical to the one shown, it is omitted for the sake of simplicity. Operation for either half is as follows.

The ON signal is developed by the state sequence generator 16 and applied to one of the inputs of the AND gate, 104. No current will be flowing when the ON signal initially goes high. Consequently, the CHOP input to gate 104 will be high. This input combination forces the output of inverting gate 108 low which turns control transistor 110 on. Current flows through diodes 112 and 114 generating potential across resistor 115. Base drive is thus supplied to transistor 12A which allows it also to turn fully on as seen in the first plot of FIG. 9A. The result is that current buildup begins in motor phase A as dictated by the expression:

$$i(t) = \frac{V}{R}\left(1 - e^{\frac{-tr}{L}}\right)$$

The path for this current in phase A is shown in dashed lines marked $I_{RISE}$ in FIG. 9. Current buildup will continue as shown in the second plot of FIG. 9A until the current reaches the current threshold (I THRESHOLD) level shown by the dashed line) set by the current threshold reference. When this level is reached, the CHOP input goes low which results in gate 108 going high and transistor 110 and 12A turning off.

Upon turnoff, the current rise ceases and the energy stored in the magnetic field of phase A must discharge. Because phase winding 10A' is wound on the same core as phase winding 10A but is of opposite polarity, it provides a convenient discharge path for this stored energy. Diode 16A' allows such a path to be realized. The energy discharge takes the form of current flow along the path of I DECAY represented by dashed lines in FIG. 9. The decay current will continue for the duration of the blanking period set by the timed chopper circuitry.

It should be noted that the magnetic coupling between phase windings 10A and 10A' is not perfect by the dashed line path I LEAKAGE. Therefore, some leakage inducatance (LA and LA') is present as represented in FIG. 9. This means that a small portion of the primary phase flux will collapse via the opposing phase. Consequently, an alternate route for the current due to the leage flux must be provided. This provision is made with the addition of diode 122A and zener diode 124. The leakage current path (I LEAKAGE) is as shown by dashed lines in FIG. 9. It should be noted that the zener diode 124 functions to clamp the level to which the voltage may rise to within a safe limit. Furthermore, it insures a fast decay of current at turnoff.

Figure 9A:
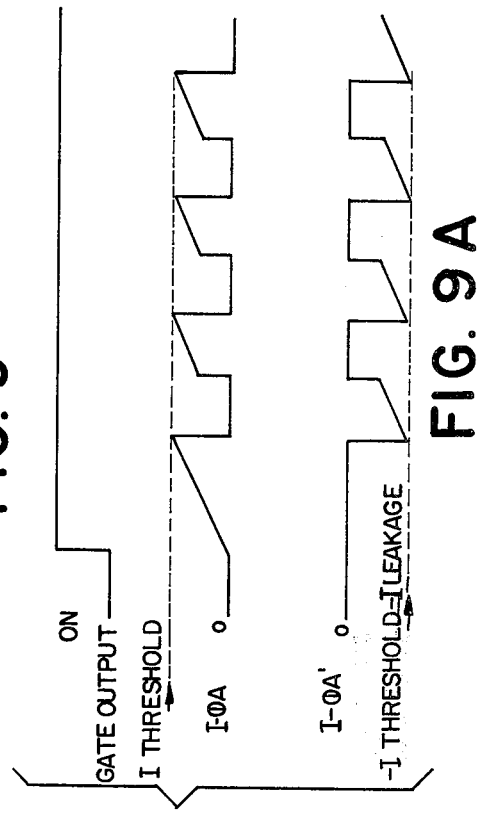
FIG. 9A is a composite plot of current associated with FIG. 9.

The third waveform of FIG. 9A shows the decay currents and offers comparison with drive current of their corresponding effects during the phase A energization period. It should be noted that due to the motor's construction, each opposing winding is arranged such that each is always over a magnetic pole of an opposite polarity. Thus, useful torque will be generated even during the decay period. In other words, the bipolar nature of the phase current results in an efficient means of utilizing the motor's windings.

The above description can be extended to cover operation of the circuit when phase A' is energized. Because of its symmetry, the input into the base of transistor 12A' has been omitted, but will be understood to correspond exactly to that into transistor 12A, and to function in a similar manner.

FIG. 9 includes a typical driver section which is associated with each output transistor 12 of the drive. Its purpose is to amplify the low-level logic commands and optimize the power transistors switching speeds. Thus, transistor dissipation is kept at a minimum.

FAULT PROTECTION CIRCUITRY

The occurrence of certain external events which may prove destructive to the drive cannot always be avoided. In order to prevent permanent damage due to such events, protective measures must be taken. As part of the present invention measures and circuitry have been developed to protect against them.

A very common fault which may occur is the loss or reduction of the supply voltages (+12 volts and -12 volts). Because CMOS circuitry is preferably used throughout the drive, a special problem can arise, as follows.

CMOS characteristics allow for active operation down to approximately the +3 volt level. This means that for low supply voltage conditions, the power transistors can still be signalled into conduction. However, since the transistors base drive is developed from the same supply, an insufficient amount of current will be injected into their base terminals. Thus, saturation of these devices cannot be guaranteed under such circumstances. Consequently, the transistors will tend to operate in their linear regions. Ultimately, the dissipation becomes excessive and transistor destruction (forward-biased secondary breakdown) generally results.

Alternately, loss of the negative supply voltage will result in improper operation of the op-amp/comparator circuitry. Since this circuitry controls the current regulation of the drive, improper operation would be disasterous.

From the above, it can be seen that a means of detecting the supply voltage outputs and generating a safe shutdown upon failure is essential. Moreover, a means of disabling the drive by means of an external source should be allowed for. The low voltage/external fault protection circuitry of FIG. 10 accomplishes this task.

Figure 10:
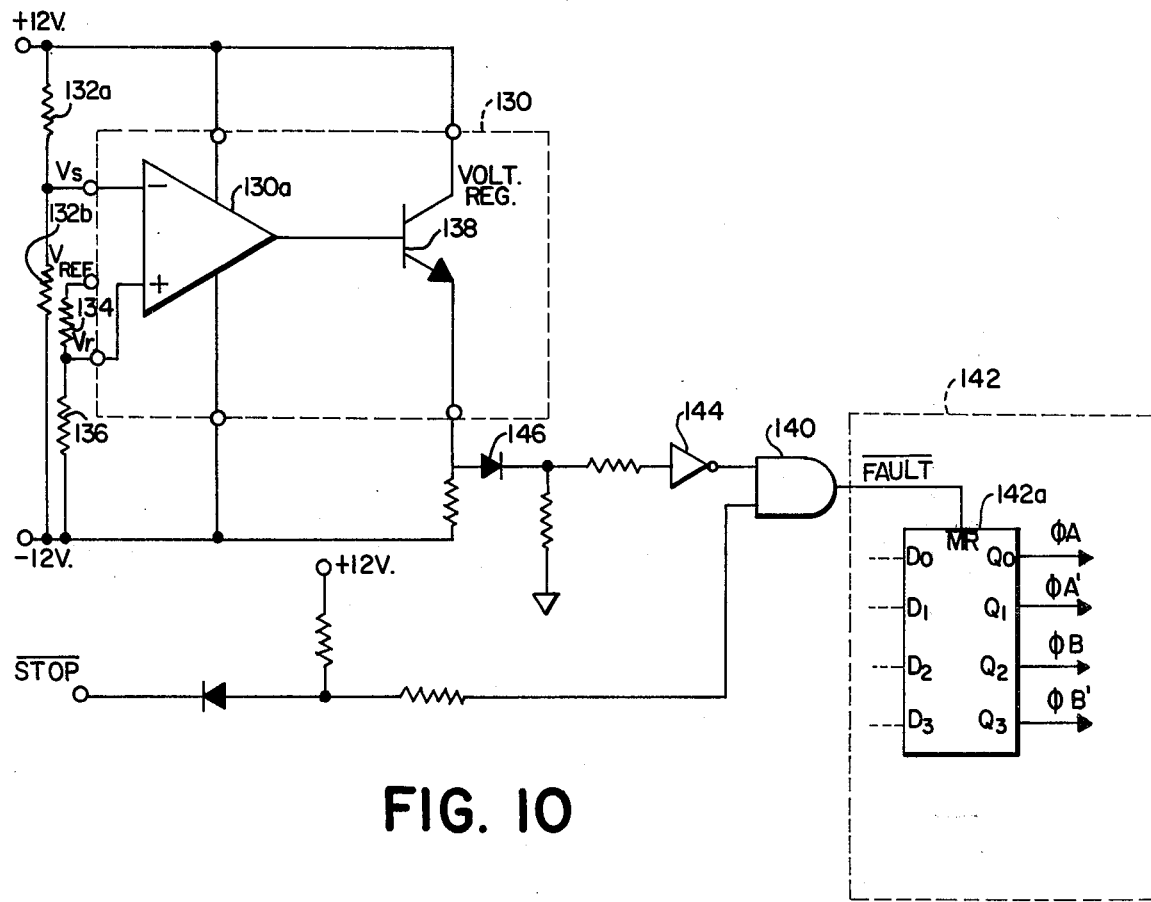
FIG. 10 is a low voltage external fault protection circuit in accordance with the present invention.

The circuit of FIG. 10 is built around the 723 integrated circuit voltage regulator chip 130. As can be seen, the chip is references to the -12 volt rail. Use is made of the chip's internal voltage reference $V_r$ comparator 130a and output transistor 138.

The internal voltage reference is used to set the low voltage threshold level, $V_r$. Proper threshold selection is determined by the minimum safe supply levels which can be tolerated by the drive. This level is set by resistors 134 and 136 and applied to the comparator's non-inverting (+) input.

Another voltage, representative of the rail-to-rail voltage level ($V_s$) is established by the divider network of 132a and 132b. This signal is applied to the inverting (−) input of comparator 130a. When both supplies are at proper operation levels, $V_s$ exceeds $V_r$. Thus, the comparator's output is low and the output transistor is cut off. Consequently, the input of gate 144 through diode 146 is held at ground, resulting in a logic high at its output. This state holds the output of AND gate 140 ($\overline{FAULT}$) high (assuming the $\overline{STOP}$ external input is also high) and normal drive operation is allowed.

The $\overline{FAULT}$ output can be activated (brought low) in either of two ways. Externally grounding the $\overline{STOP}$ input is one means. Its result is self-evident. This allows for disabling the drive on command by an external source.

The second means of activating the $\overline{FAULT}$ line occurs when either of the supply voltages falls below its normal output level. When this occurs, the $V_s$ input becomes less than the $V_r$ input which pulls the comparator's output toward the upper rail. This turns the output transistor on which asserts the input gate 144 high. This, in turn, drives the input of gate 140, low activating the $\overline{FAULT}$ line.

The $\overline{FAULT}$ line ties into the $\overline{MASTER\ RESET}$ of the state sequence generator. This instantly signals all of the output transistors out of conduction. This results in a safe and reliable means of shutting down the drive.

STEP COMMAND FAULT DETECTOR

Figure 11:
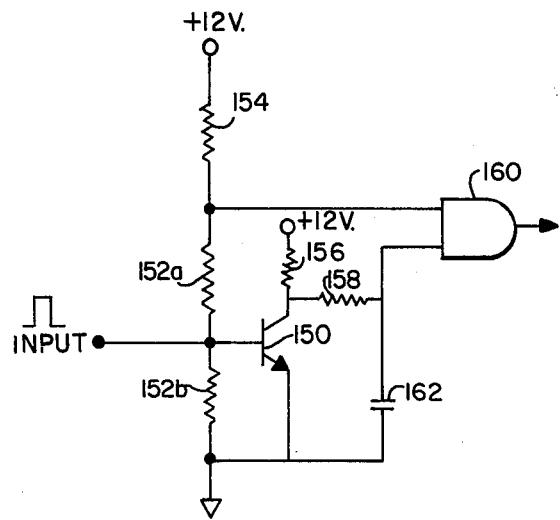
FIG. 11 is a step command fault detector in accordance with the present invention.

In order to insure proper operation of the drive, the step command input should be a short (1 μS) positive pulse. Should this input remain high (due to loss of command) for a much longer period of time, improper operation of the internal timing circuitry would result. The problem specifically occurs in the velocity variable timed chopper circuitry. The resulting problem is such that the off-time period will remain set at its initial minimum value and the chopping rate will be maintained at its maximum frequency. Consequently, unnecessary dissipation in the output transistors and zener diodes results. If this state were allowed to continue for an extended period of time, component failure would soon occur. Thus, this situation must be avoided. The step command fault detector of FIG. 11 guards against such a condition. Circuit operation is as follows:

Normal step input commands can be defined as 1 μS pulses occurring at a maximum frequency of 10 KHz. Resistors 152a and 152b provide a voltage divider determing bias voltage on the base of transistor 150 related to a somewhat higher voltage across which they are connected applied to the reverse terminal gate 160. That voltage is determined by a voltage divider across the 12 volt supply consisting of resistor 154 and resistors 152a and 152b. During normal input conditions, transistor 150 (FIG. 11) conducts whenever a pulse occurs. The time constant of the R-C network of resistors 156 and 158 and capacitor 162 is chosen such that these pulses do not allow the capacitor 162 to discharge through gate 160 to a value below the logic high threshold. Thus, the step command passes unaffected through gate 160 into the drive.

Should the step input remain high for a period much in excess of the normal 1 μS period, transistor 150 will conduct over this interval. Thus, the capacitor can fully discharge through the transistor 150. This results in a logic low being developed at the input of gate 160 which effectively disables the step command to the drive. With a low at the output of G1, the velocity variable timed chopper will be allowed to cycle down to its minimum chopping frequency and power component failure can be avoided.

DRIVE SUMMARY

Figure 12:
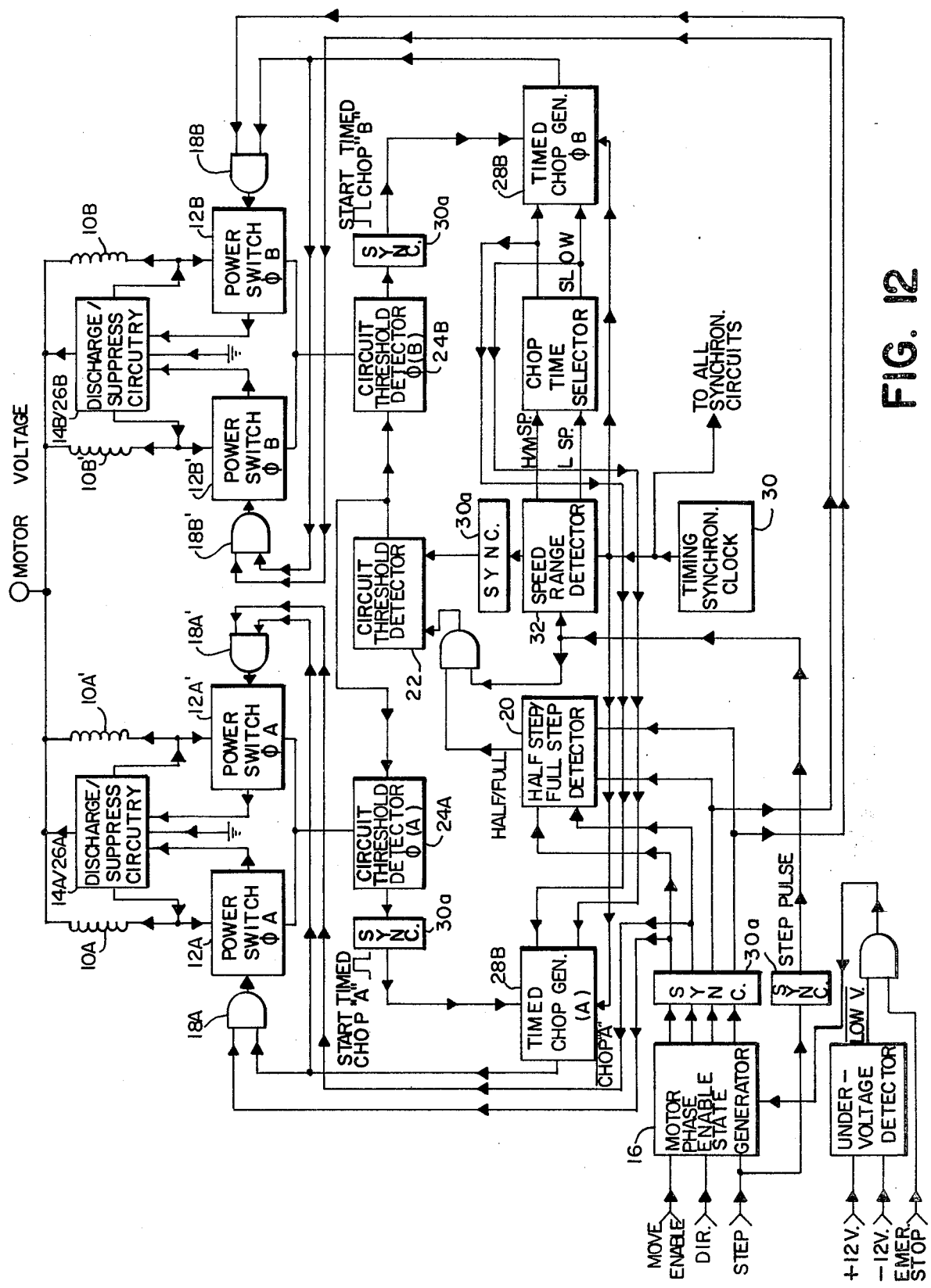
FIG. 12 is a block diagram of the complete drive system of the present invention.

The proceeding sections have provided a description of the individual blocks which together make up the current modulated step motor drive. To organize these blocks into a practical drive, the layout of FIG. 12 is used. This figure shows the block diagram of the drive.

Figure 13C:
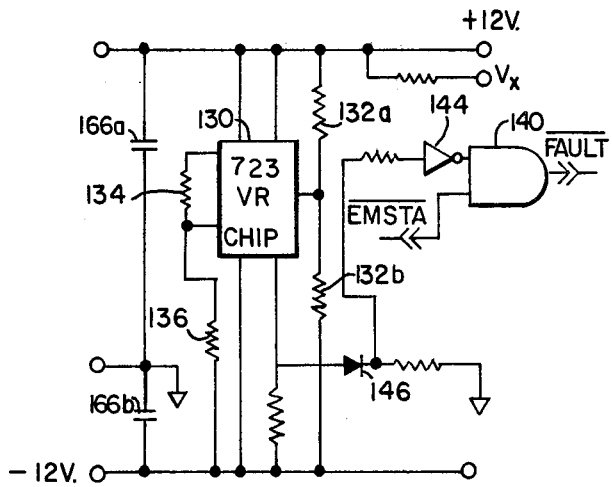
FIGS. 13A, 13B and 13C in composite representing a complete circuit diagram of the complete drive.
Figure 13A:
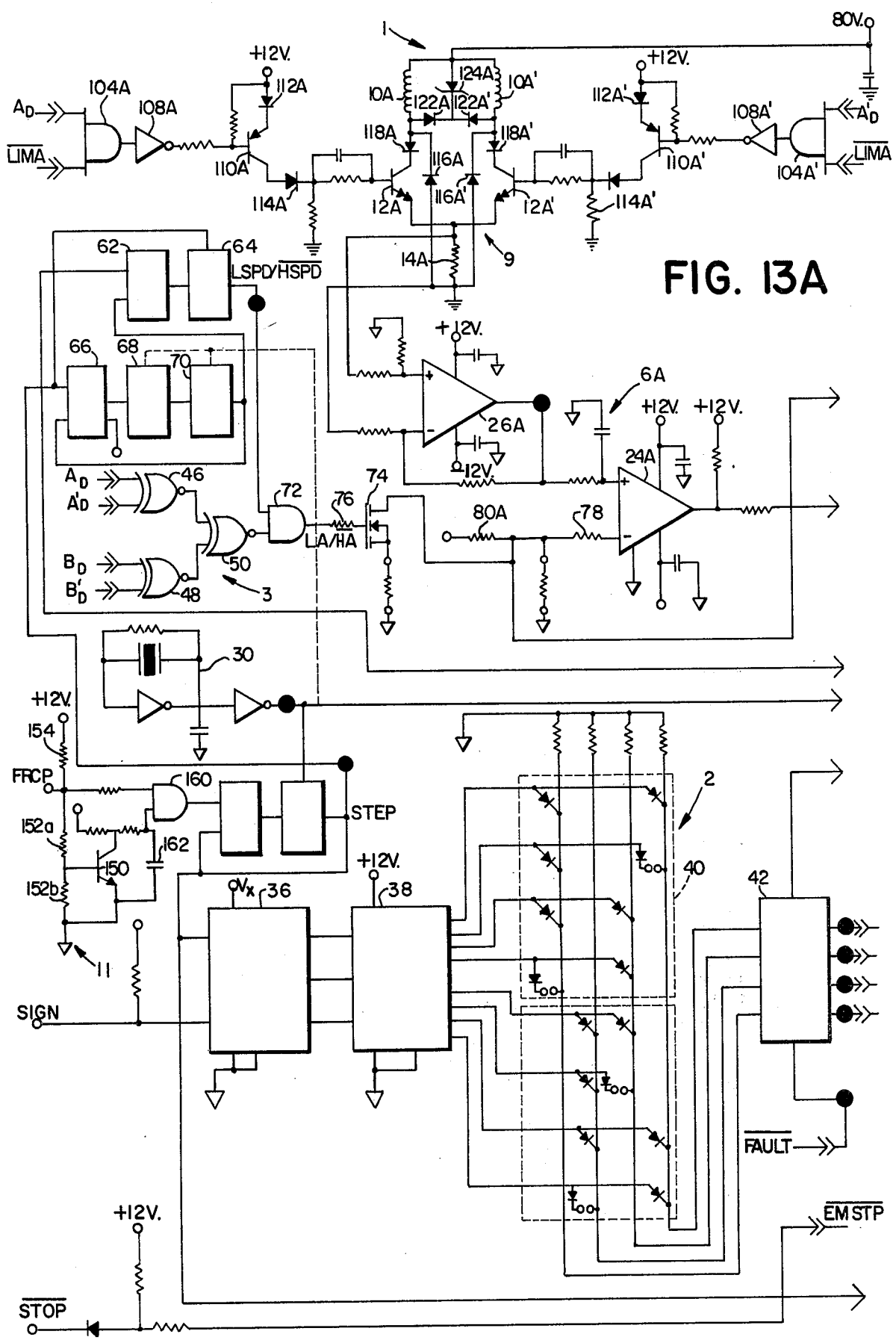
Figure 13B:
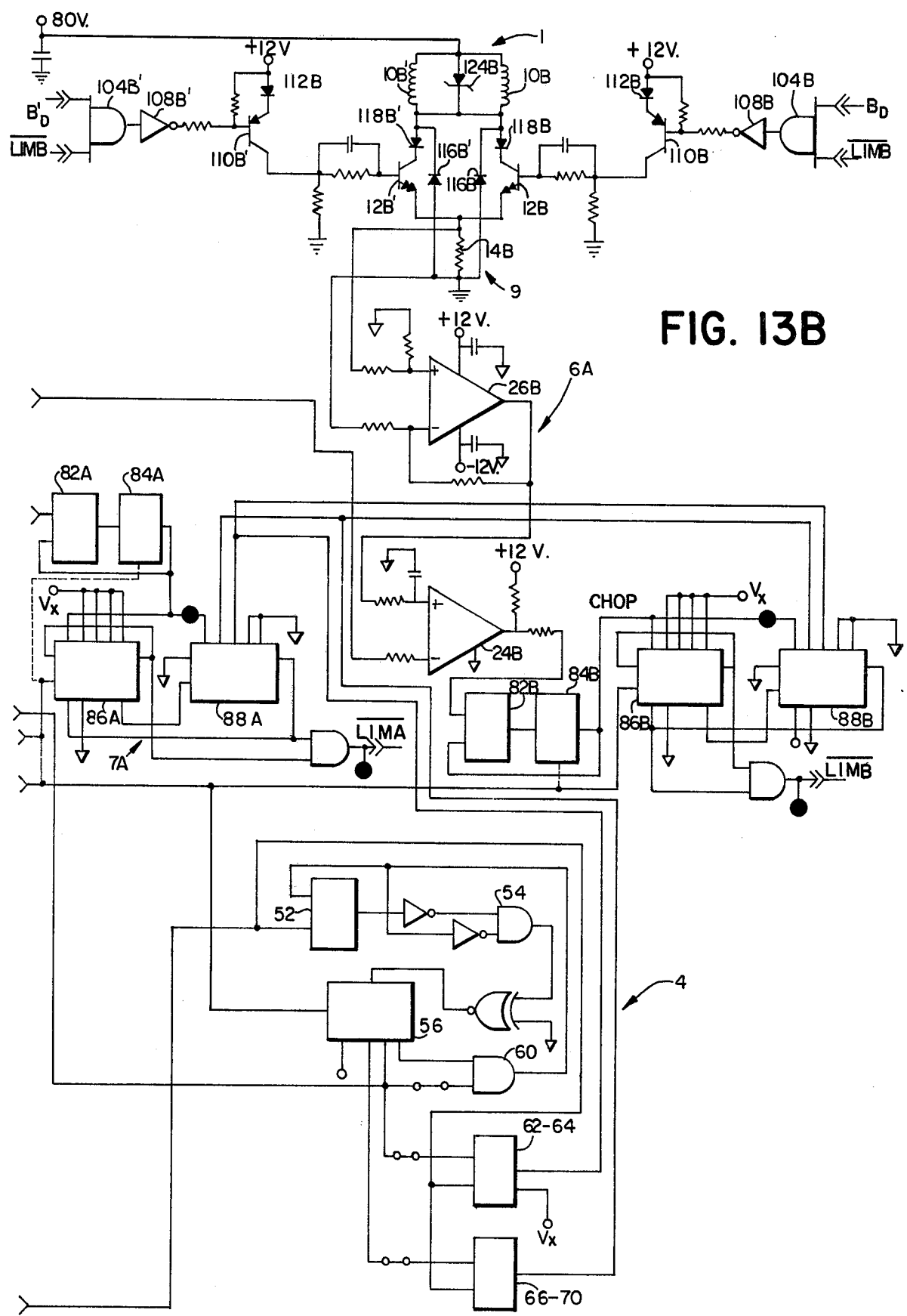

Also included is a schematic diagram of the drive. This schematic is shown in FIG. 13. From the figure, details of the actual drive implementation can be obtained.

In conclusion, it should be mentioned that the configuration represented in the schematic has been constructed and thoroughly tested. Results of these tests have proven that the design has met the standards of a high-performance, reliable and economical step motor drive.

Many modifications and variations of the systems described will occur to those skilled in the art. All such modifications and variations within the scope of the claims are intended to be within the scope and spirit of the present invention.

I claim:

1. A step motor drive for a motor having at least one field winding for each of two phases comprising:
   a solid state control device in series with each field winding and having a control terminal selectively permitting stepping drive current flow through its winding;
   gate means for each of said control terminal;
   sequence control means selecting the sequence of application of control signals to the gate means of the selected control device to determine the sequence of energizing the series windings;
   timed current chopper means to apply a timed signal to the gate means to determine when the control signal may be applied to the control electrode of the control device to render it conductive and to determine what part of a drive signal current wave may be applied across that series field winding, and
   means sensing the current flow in each phase to provide a signal to a comparator which also receives a reference signal for comparison to provide a comparator signal to the timed current chopper means whereby the timed signal of the chopper to the gate means is varied according to the motor velocity.

2. The step motor drive of claim 1 in which the sensing means is a resistor with means to measure voltage drop across that resistor.

3. The step motor drive of claim 1 in which each of the two phases has two windings, each with its own series control device having a control terminal, and separate gate means for each control terminal with a common timed current chopper means feeding both gate means of each phase, and sequence control means which select the gate means to be separately controlled.

4. The step motor drive of claims 1, 3, or 4 in which each of the two phases has two windings wound in bifilar configuration, each winding with its own series control device having a control terminal and separate gate means for each control terminal, a timed current chopper means feeding both gate means of each phase and sequence control means which select the gate means to be separately controlled, a decay current circuit including a capacitor connected to the common connection of the bifilar windings and connected, in turn, through separate diodes to the respective opposite ends of the windings, and a leakage current path provided by diodes connected to said opposite end of the winding, each in turn, connected to the voltage limiting side of a common zener diode, which is connected, in turn, to the common connection of the bifilar windings.

5. The step motor drive of claim 2 in which the voltage sensed across the sensing resistor is applied to an operational amplifier to whose reference terminal is applied a reference voltage indicative of predetermined reference effects to drive an output whereby the output is applied to bistable means whose output is applied to a terminal of an output gate which is turned on at a second terminal by a clock pulse to generate a chop pulse, which is output and fed back to reset the bistable means.

6. The step motor drive of claim 5 in which two operational amplifiers are used the first directly across the sensing resistor and the second having the output of the first is connected on one input terminal and the reference voltage to the other input terminal.

7. A step motor drive for a motor having at least one field winding for each of two phases comprising:
   a solid state control device in series with each field winding and having a control terminal selectively permitting stepping drive current flow through its winding;
   gate means for each of said control terminals;
   sequence control means selecting the sequence of application of control signals to the gate means of the selected control device to determine the sequence of energizing the series windings and providing means for the controlling motor direction by selecting the sequence of application of control signals which includes up/down counter means having means to select direction of the count and responsive to input pulses to count in the selected direction and in which input pulses to the counter are output to an output storage means to store a selected condition and in which said storage means are provided with clearing means and a clock such that all storage devices are cleared by a common clock pulse;

timed current chopper means to apply a timed signal to the gate means to determine when the control signal may be applied to the control electrode of the control device to render it conductive and to determine what part of a drive signal current wave may be applied across that series field winding;

an output from the counter into individual channels corresponding to each of the individual counts;

output storage means corresponding to each of the phase windings;

matrix transfer means enabling preselected transfer at each count to one or more storage means, whereby the phases will be selected by the count to provide an invariable step sequence in each direction; and means sensing the current flow in each phase to provide a signal to a comparator which also receives a reference signal for comparison to provide a comparator signal to the timed current chopper means whereby the timed signal of the chopper to the gate means is varied according to the motor velocity.

8. The step motor drive of claim 7 in which the selected condition of the output storage means is applied to the control terminal of their respective control device to determine whether or not current can flow in its associated field winding.

9. The step motor drive of claim 8 in which A phase is made up of A and A' field windings and B phase is made up of B and B' field windings wherein the output for A and A' field windings of A phase are fed to a common EXCLUSIVE-NOR gate and the output from the B and the B' field windings of B phase are fed to a second EXCLUSIVE-NOR gate, and the outputs of the first and second EXCLUSIVE-NOR gates are fed to a third EXCLUSIVE-NOR gate to provide a phase detector to indicate at the output of the third gate either when one or two field windings are conducting.

10. The step motor drive of claim 9 in which outputs from the phase detector and from a high speed/low speed detector are fed to respective terminals of an AND gate whose output in turn is applied to control terminal of a VFET, which in turn generates a reference voltage depending upon whether it is high speed or low speed and whether one or two field windings are connected.

11. The step motor drive of claim 10 in which a voltage reference is taken from the junction point of a resistor divider have a first resistor portion connected between a voltage source and reference point and a second resistor portion connected across the reference point and ground and the VFET connected through a third resistor parallel with the second resistor portion to ground to thereby lower the effective resistance to ground from the reference point when the VFET conducts and thereby drop the reference voltage at the reference point.

* * * * *

UNITED STATES PATENT AND TRADEMARK OFFICE
CERTIFICATE OF CORRECTION

PATENT NO. : 4,336,484
DATED : June 22, 1982
INVENTOR(S) : Joseph A. Marinko

It is certified that error appears in the above-identified patent and that said Letters Patent are hereby corrected as shown below:

Correct the title to read: --CURRENT MODULATED STEP MOTOR DRIVE AND CONTROLS--;

Column 2, line 60, "motor" should be --rotor--;

Column 3, line 34, "$T_{100B}$" should be --$T_{\emptyset B}$--;

Column 6, line 23, "3" should be --8--;

Column 7, line 46, "executed" should be --exceeded--;

Column 8, line 68, "LSPD/HSPD" should be --LSPD/$\overline{HSPD}$--.

Signed and Sealed this

Twenty-fourth Day of August 1982

|SEAL|

*Attest:*

*Attesting Officer*

GERALD J. MOSSINGHOFF

*Commissioner of Patents and Trademarks*